United States Patent [19]

Allaire

[11] Patent Number: 5,314,599
[45] Date of Patent: May 24, 1994

[54] BARRIER LAYER AGAINST FLUORIDE DIFFUSION IN LININGS OF ALUMINUM REDUCTION CELLS

[75] Inventor: Claude Allaire, Chicoutimi-Nord, Canada

[73] Assignee: Alcan International Limited, Montreal, Canada

[21] Appl. No.: 921,294

[22] Filed: Jul. 28, 1992

[51] Int. Cl.$^5$ .......................... C25C 3/08; C21B 7/04; F27B 14/10; C04B 35/02

[52] U.S. Cl. .................. 204/243 R; 204/294; 266/284; 266/286; 266/275; 266/280; 432/264; 501/123

[58] Field of Search .................... 204/243 R–247, 204/290 R, 294; 266/280, 275, 286, 284; 432/264; 501/123

[56] References Cited

U.S. PATENT DOCUMENTS

| | | | |
|---|---|---|---|
| 4,411,758 | 10/1983 | Hess et al. | 204/243 R |
| 4,536,273 | 8/1985 | Seltveit | 204/243 |
| 4,647,357 | 3/1987 | Dewing | 204/243 R |
| 4,683,046 | 7/1987 | Scharpey et al. | 204/243 |
| 5,060,831 | 10/1991 | Fishler | 266/280 X |
| 5,106,797 | 4/1992 | Allaire | 501/155 |
| 5,188,794 | 2/1993 | Daussan et al. | 266/275 X |

FOREIGN PATENT DOCUMENTS

| | | |
|---|---|---|
| 0127705 | 6/1983 | European Pat. Off. |
| 0132031 | 5/1984 | European Pat. Off. |
| 0318305 | 5/1989 | European Pat. Off. |
| 0399786 | 11/1990 | European Pat. Off. |
| 711335 | 1/1980 | U.S.S.R. |

OTHER PUBLICATIONS

Database WPI—Week 24, 1986 Derwent Publications, Ltd., London, GB; An 86-152833—JP, A,61 086 067 (Shinagawa Fire Brick) May 1, 1986 (Abstract).

*Primary Examiner*—Donald R. Valentine
*Attorney, Agent, or Firm*—Cooper & Dunham

[57] ABSTRACT

A barrier layer for prevention of solid fluorides penetration, e.g. NaF, from the interior of an aluminum production cell holding a fluoride-containing melt into a refractory layer intended to provide heat and electrical insulation for the cell. The barrier layer contains CaO, which may be derived from a CaO precursor such as calcite ($CaCO_2$) by decomposition during cell start-up. Since CaO does not appear to react with sodium fluoride (NaF), and indeed according to thermodynamic calculations seems incapable of doing so at cell operating temperatures, it is effective for preventing the penetration of that compound when the latter is in the solid state. The barrier layer makes it possible to use insulating low cost refractories which are attacked by solid fluorides in the cell wall lining with improvement of the life of such materials. The barrier layer also keeps fluorides out of the refractory materials so that these materials can be disposed of in conventional land-fill sites without risk of causing pollution due to leaching of fluoride salts.

16 Claims, 1 Drawing Sheet

BARRIER LAYER AGAINST FLUORIDE DIFFUSION IN LININGS OF ALUMINUM REDUCTION CELLS

BACKGROUND OF THE INVENTION

I. Field of the Invention

This invention relates to heat-insulating refractory linings used for aluminum reduction cells and other similar equipment which contains fluorides at high temperatures. More particularly, the invention relates to barrier layers in such refractory linings intended to inhibit or restrict the migration of fluorides from the contents of the cell or other equipment into the refractory lining materials.

II. Background of the Prior Art

Hall-Heroult cells used for the production of aluminum metal from alumina by electrolysis hold a charge of molten electrolyte which contains cryolite ($Na_3AlF_6$), a complex fluoride consisting of a mixture of sodium fluoride (NaF) and aluminum fluoride ($AlF_3$) which is exposed to high temperature (usually higher than 900° C.). The bottom wall (or floor) of the cell has a lining of carbon blocks forming a cathode and one or more layers of refractory material between the cathode blocks and the outer metal shell of the cell. The refractory lining provides heat and electrical insulation for the cell, which is necessary for efficient cell operation.

A problem which is encountered in cells of this kind is that cell contents, particularly the fluoride components, tend to penetrate through the carbon cathode layer into the refractory layers. This causes two particular problems. Firstly, the fluoride may react with the refractory material, normally an alumina-silica based material, to produce a compound of lower melting or glass transition point than the original material, thus causing the refractory to deform or lose its high heat insulating properties. Secondly, the presence of fluorides in the refractory lining creates environmental problems when the refractory linings are eventually to be disposed of. This is because the fluorides, e.g. NaF, are water-soluble and readily leach out of waste refractories disposed of in land-fill sites.

Penetration by the cell contents into the refractory linings can take place in two forms. Firstly, the molten material may penetrate through gaps in the carbon cathode lining and pores within the refractory material promoting their dissolution. However, in modern cells, liquid penetration can often be substantially eliminated by the use of suitable joint compounds and cements for the cathode blocks, so this may not be a major concern. Secondly, solid fluoride produced from reactions in the cathode blocks, as well as metallic sodium which originates from solid diffusion through these blocks may penetrate the refractory lining. Such penetration cannot be stopped merely by avoiding cracks in the cathode lining and it results in considerable fluoride contamination of the refractory layers and deterioration of their insulating properties.

This problem has been addressed in my prior U.S. patent application Ser. No. 07/527,533 filed on May 23, 1990, the disclosure of which is incorporated herein by reference. In this prior application, a layer of alumina-silica based insulating material having a high alumina:silica ratio is positioned immediately below the cathode blocks because material of this kind is not harmed by contact with NaF or metallic Na at high temperatures. Alumina-silica based materials of lower alumina:silica ratio (which are less expensive and may be more highly insulating) are positioned below this first layer, particularly in those regions of the insulation subject to temperatures below 700° C., where reaction with NaF and Na is not problematic (i.e. do not cause glassification of the material). However, while this deals with the harmful effects of NaF and Na on the insulating material, it does not deal with the problem of environmental damage caused by disposal of fluoride-containing refractories.

It would therefore be advantageous to provide a layer of material in the cell wall beneath the carbon cathode layer to act as a barrier against penetration of solid fluoride.

U.S. Pat. No. 4,536,273 which issued on Aug. 20, 1985 to Seltveit discloses the concept of providing a diffusion barrier for the bottom lining of electrolysis cells. The barrier has a composition that, upon reaction with penetrating sodium fluoride-containing melt, forms solid compounds at the operational temperature of the cell. The objective is to cause all of the fluoride penetrating the carbon cathode to become bound as solid $CaF_2$, which is solid at the temperatures normally encountered below the cathode lining (e.g. 900° C.), thus arresting the penetration of the liquid contents. This is achieved by using calcium aluminum silicates, or mixtures of calcium silicates and alumina, as the barrier material. In Column 3, lines 54 to 58 of the patent, there is a warning against the use of materials which contain mineral phases which absorb water during storage or installation, e.g. free CaO and $3CaO.SiO_2$. This barrier material is intended to protect the refractory lining from penetration by liquid cell contents, but apparently does not protect against penetration by solid fluorides. Moreover, since the barrier material reacts with the fluorides from the cell, disposal of this material would cause environmental problems.

U.S. Pat. No. 4,683,046 to Scharpey et. al. which issued on Jul. 28, 1987 discloses the use of various metal oxides for sealing gaps present between carbon-carbon blocks used to form the cathode in cells of the above kind, and to seal other similar joints. The sealants include calcium oxide, magnesium oxide, barium oxide, calcium fluoride, magnesium fluoride, barium fluoride, silicon oxide, iron-III-oxide, silicon carbide, titanium nitride, boron nitride, chromium-III oxide and aluminum oxide, and are used in powder form. However, these materials are "limited to the particularly vulnerable regions" and, like the Seltveit invention mentioned above, are concerned with the prevention of penetration of molten aluminum and electrolyte into the refractory lining. There is no mention of the problem caused by the penetration of solid fluorides.

U.S.S.R. patent 711,335 published on Jan. 25, 1980 in the name of the State Institute for Secondary Light Metal Research, Study and Planning, discloses the use of a layer of calciferous fibrous material (which could also be translated as "fibrous lime material") in order to prevent penetration of molten aluminum or other metal into a refractory furnace lining layer. According to the patent, molten metal penetrating the refractory lining finds the calciferous fiber layer in its path and is brought to a halt. Again, the invention is concerned with the prevention of penetration by molten materials rather than the diffusion of harmful solids. Moreover, fluorides are not present in the metal melting furnaces to which this patent relates, so there is no clear relationship between this patent and the present invention.

Despite these teachings of the prior art, there is therefore still a need for a way of preventing solid fluorides from penetration into refractory linings of aluminum reduction cells or similar high temperature metal treatment apparatus in which penetration of solid fluorides into refractory insulating layers is of concern.

OBJECTS OF THE INVENTION

An object of the present invention is to provide barrier layer in an aluminum reduction cell, or similar equipment provided with a refractory lining, capable of preventing, or significantly reducing, the penetration of solid fluorides into the interior of the lining.

Another object of the invention is to provide barrier materials capable of preventing the penetration of solid fluorides, in the refractory linings of aluminum reduction cells and similar equipment.

SUMMARY OF THE INVENTION

It has now unexpectedly been found that calcium oxide (lime) forms an effective barrier against the penetration of solid fluorides into refractory heat-insulating linings of aluminum reduction cells and similar metal-handling equipment.

According to one aspect of the invention, there is provided an apparatus for containing a molten fluoride-containing salt material at high temperature comprising an outer shell partially surrounding an interior space for containing said salt mixture, said shell having a lower wall, an internal lining for said shell, at least adjacent to said lower shell wall, made of a material substantially impermeable to said molten salt material, and at least one layer of refractory material between said lining and said lower shell wall, wherein said at least one refractory layer comprises a continuous barrier layer of CaO adjacent to said lining material.

According to another aspect of the invention, there is provided a process of producing apparatus for containing a molten fluoride-containing salt material at high temperature having an outer shell partially surrounding an interior space for containing said salt mixture, said shell having a lower wall, an internal lining for said shell, at least adjacent to said lower shell wall, made of a material substantially impermeable to said molten salt material, and at least one layer of refractory material between said lining and said lower shell wall, which comprises forming a barrier layer of CaO adjacent to said impermeable material between said lining and said lower wall of said shell.

The use of a barrier layer according to the present invention makes it possible not only to dispose of refractory insulating materials in land-fills or by other conventional means, but also makes it possible to use low-cost potlining refractories, e.g. medium-duty firebricks, while extending their insulating characteristics during service, even in those parts of the lining which are subjected to temperatures above 700° C. Such refractories tend to be susceptible to attack and degradation by solid NaF, as well as by metallic sodium, but do not come into contact with this fluoride, which is the most corrosive cell chemical, when protected by the barrier layer.

DETAILED DESCRIPTION OF THE INVENTION

Figure 1:
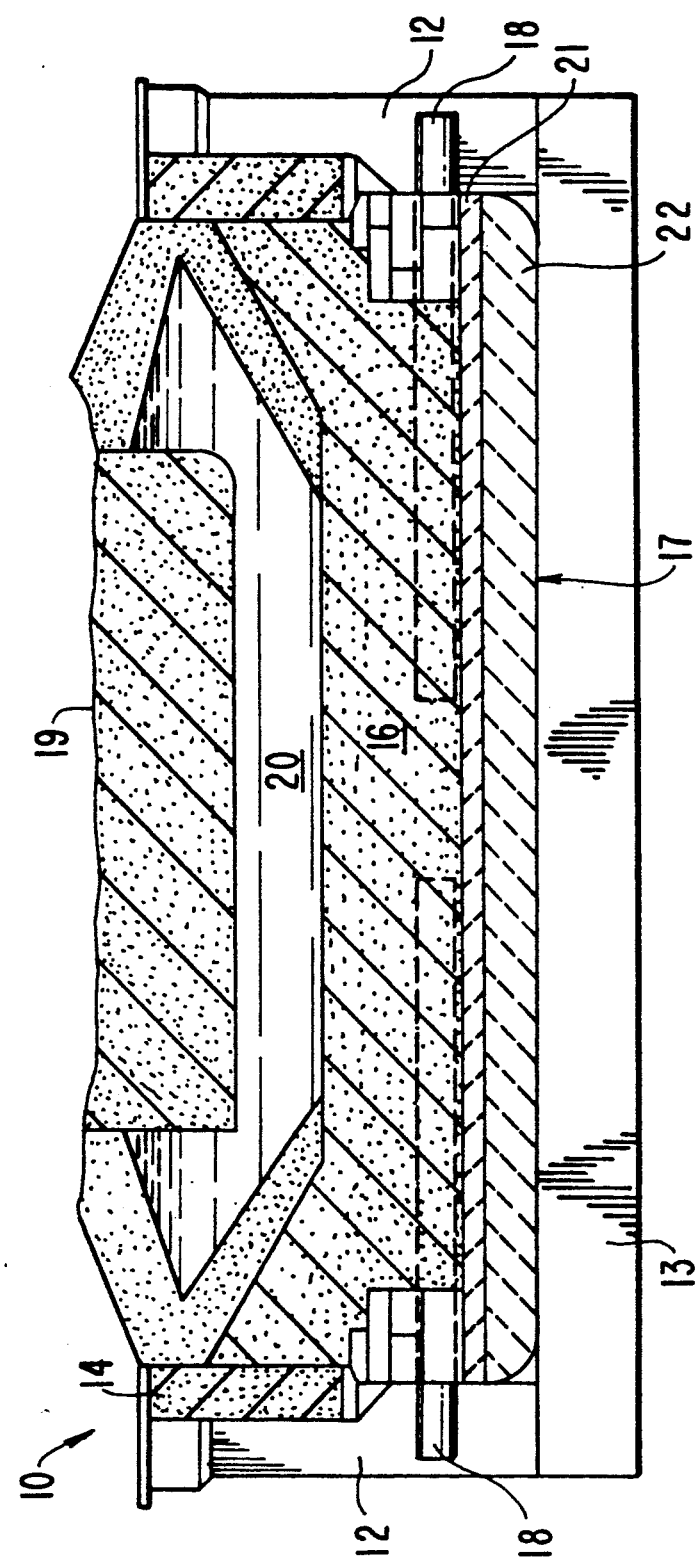
FIG. 1 is a cross-section of an aluminum reduction cell having a barrier layer according to one preferred embodiment of the present invention.

As noted above, it has unexpectedly been found that calcium oxide (lime) has the ability to substantially prevent the penetration of solid metal fluoride salts from a high temperature melt containing such salts into a refractory lining of equipment containing the melt. This material can therefore be used as a barrier layer in aluminum production cells and similar equipment to prevent penetration of the refractory lining by metal fluorides, particularly NaF, thus protecting the refractory materials from damage caused by exposure to fluorides at high temperature and avoiding environmental problems upon the disposal of the refractory materials.

Most materials such as MgO, $Al_2O_3$, $SiO_2$ and others, including mixtures of these oxides containing or not containing CaO, do not prevent the penetration of solid fluorides below the carbon cathode in alumina reduction cells. Such materials when contacting NaF and/or Na lead to the formation of reaction products (e.g. glassy phases) in which NaF is soluble. Unlike these materials, CaO do not react with NaF and/or Na, and thus offers a negligible solubility of NaF. This lack of reaction is confirmed thermodynamically, as follows:

$$CaO + 2NaF \rightarrow CaF_2 + Na_2O \quad \Delta Go \Rightarrow +31.87 \text{ Kcal}$$
$$(1300° K.) \tag{1}$$

$$CaO + 2Na \rightarrow Ca + Na_2O \quad \Delta Go \Rightarrow +66.64 \text{ Kcal}$$
$$(1300° K.) \tag{2}$$

Surprisingly, in the case of MgO, for example, such lack of reaction between the material and NaF and/or Na is also predicted by the thermodynamic calculations:

$$MgO + 2NaF \rightarrow MgF_2 + Na_2P \quad \Delta Go = +47.36 \text{ Kcal}$$
$$(1300° K.) \tag{3}$$

$$MgO + 2Na \rightarrow Mg + Na_2O \quad \Delta Go = +56.61 \text{ Kcal}$$
$$(1300° K.) \tag{4}$$

However, as pointed out previously, MgO is not efficient as a barrier to solid fluoride in a cell and is effectively corroded by NaF and/or Na (as shown in Comparative Example 4 provided later in this disclosure).

There are various types of "lime" which differ slightly according to their temperatures of formation (calcination). All these types of lime can be used in the present invention, e.g. the types indicated below:

| TYPE OF LIME | TEMPERATURE OF CALCINATION (°C.) | HYGROSCOPIC |
|---|---|---|
| Quick lime | <1000° C. | YES |
| Calcined lime | 1000–1200° C. | YES |
| Hard calcined lime | 1400–1500° C. | YES |
| Dead-burned lime | >1500° C. | NO |

As indicated above, most kinds of lime, except for dead-burned lime, are hygroscopic and tend to absorb moisture during storage and handling prior to use. This is disadvantageous, and so care should be taken when using hygroscopic kinds of lime to avoid prolonged exposure to moist air.

However, it is also possible to avoid such problems by using a CaO precursor which is converted to lime in situ during the start-up heating procedure for cell operation.

It is particularly advantageous in this invention to use calcium carbonate, and particularly calcite, as a CaO precursor for the formation of a barrier layer. When the temperature of the equipment rises above about 600° C. as it is being heated to the operational temperature, the calcite is thermally decomposed to CaO and carbon dioxide according to the following reaction:

$$CaCO_3 \rightarrow CaO + CO_2 \uparrow$$

The reaction is normally complete after the start-up of the equipment but before the fluorides have had an opportunity to reach the barrier material.

After this reaction is complete, the resulting lime product contains a large number of pores resulting from the generation of the carbon dioxide gas, which accounts for a maximum of about 40% by weight of the calcium carbonate starting material. These pores confer relatively high thermal insulation values to the material (e.g. about 0.3 w/m °C.) and thus make the material particularly suitable as a refractory lining material. In fact, it is possible to use the resulting CaO layer not only as a barrier layer, but also as the entire insulation of the cell.

The use of calcite or other CaO precursor has the advantage that such materials, unlike lime itself, except if it has been previously "dead-burned", do not tend to absorb moisture, so they can be stored and used without special precautions being required. When the precursor has been converted to CaO during the start-up of the cell, moisture absorption is no longer a problem.

The CaO forming the barrier layer should preferably have a high purity of at least 80% by weight and more preferably at least 90% by weight. High impurity levels (more than about 20% by weight) in the CaO or in the $CaCO_3$ material after its decarbonation tend to promote the formation of liquid compounds during the operation of the equipment, following reaction with NaF and/or Na. Impurities which tend to react in this way include mixtures of $Al_2O_3$, $SiO_2$, $TiO_2$, $Fe_2O_3$, $Na_2O$ and $K_2O$. The reaction of these materials with NaF and/or Na can promote the formation of compounds having a melting temperature as low as about 700° C., which allows the penetration of fluorides and/or reduces the long term efficiency of the barrier layer.

While the $CaCO_3$ should be quite pure, as indicated above, it is possible to use calcite, which is a $CaCO_3$-bearing raw material which includes other oxides. This material is particularly desirable because of its relatively inexpensiveness.

The CaO or $CaCO_3$ is preferably used either in the form of −60 U.S. mesh powder or in the form of particles having a size of less than ¼ U.S. mesh (i.e. less than about 6 mm in diameter). In the later case, the bulk articles should preferably have a granulometric distribution such that their open porosity is less than about 30%. The particles (or powder) are used to form a continuous barrier layer positioned just below the carbon cathode blocks. The minimum thickness of the layer should preferably be about 0.5 to 1 inch in order to provide good resistance to penetration by fluorides. When the thickness of the layer is less than about 0.5 inches, there is a risk that part of the barrier material will be lost or thinned at certain locations in the cell during the installation of the cathode blocks on top of it. There is no particular maximum thickness and any thickness suitable for the cell design may be employed. However, when using $CaCO_3$ as a CaO precursor, the volume of $CO_2$ given off during the start-up of the cell may cause pressure build up and cracking of the cell lining when the layer is more than about 3 inches thick, bearing in mind that the total thickness of the refractory lining is usually only about 8.5 inches thick. The thickness of the barrier layer is therefore usually within the range of 0.5 to 3 inches thick.

Normally, conventional alumina-silica based refractory layers are provided beneath the barrier layer and the barrier layer then prevents the penetration of fluorides into these refractory layers. The refractory material used above the 700° C. isotherm passing through the refractory lining may have a high alumina ratio above 0.85 as indicated in my copending application mentioned earlier, but this may be less necessary since, when using the barrier layer of the present invention, the refractory is only exposed to metallic sodium and not to NaF which is the most corrosive cell chemical. Relatively inexpensive low alumina refractories may therefore possibly be employed, provided they are capable of withstanding the temperatures to which they are exposed during service.

If desired, as indicated briefly above, instead of using conventional refractory materials beneath the barrier layer, the CaO layer may be used alone to fill the entire space between the carbon cathode blocks and the outer shell of the equipment. In such cases, the CaO layer forms both a barrier layer and a heat insulating layer.

In most aluminum reduction cells, a refractory lining is provided only along the cell floor and the cell walls have a lining consisting solely of carbon. This allows heat to quickly dissipate through the walls and causes a solid layer of frozen cryolite to form between the carbon lining and the molten cell contents. The solid cryolite layer helps to prevent diffusion of NaF and, of course, there is no refractory for the NaF to attack, so it is not usually considered necessary to provide a barrier layer according to the invention within the cell walls. However, it has been found that penetration of NaF through the carbon layer provided along the cell walls may contribute to corrosion of the steel shell forming the outer cell housing. It may therefore be desirable to provide a barrier layer between the carbon lining and the sidewalls of the steel shell in order to prevent this. For this application, the CaO material should preferably be in the form of a powder (e.g. −65 Tyler Mesh) forming a layer having a thickness of about 0.5 to 1 inch.

If a CaO precursor, such as calcite, is to be used for the formation of such barrier layers, it should be restricted to those parts of the cell wall lining exposed to operational temperatures high enough to cause total decomposition of the precursor prior to the first addition of aluminum metal to the cell following start-up. Lime itself should be used in other parts of the cell wall linings subjected to lower temperatures. This is because, if accidental infiltration of molten aluminum takes place during the start-up of the cell, it reacts with undecomposed $CaCO_3$ to form CO at a rate much higher than the rate of formation of $CO_2$ by thermal decomposition of the $CaCO_3$, e.g. as shown by the following reaction:

$$3CaCO_3 + 2Al \rightarrow 3CaO + Al_2O_3 + 3CO \uparrow$$

The rapid evolution of CO generates harmful pressure and/or temperature increases beneath the carbon lining.

For this reason, it may be desirable to delay the introduction of metal into the cell for at least forty hours following cell start-up when using a CaO precursor in the barrier layer (either in the cell floor or, more especially, in the cell wall linings).

A typical application of the barrier layer of the present invention is shown in FIG. 1 of the accompanying drawings which is a cross-section of a typical Hall-Heroult cell 10 for the manufacture of aluminum from alumina (bauxite). Since the cell is, except for the provision of a barrier layer according to the invention, conventional, it is believed that only a brief description of its elements and functions need be provided.

The cell has an outer metal shell formed by sidewalls 12 and bottom wall 13. On the inside, the cell is lined with a carbon sidewall lining 14 and a carbon layer 16 forming the cathode of the cell. Current is collected from the carbon cathode by metal collector bars 18 which project through sidewalls 12. A carbon anode 19 opposes the carbon cathode 16 and brings about the required electrolysis of alumina dissolved in a molten mass 20 of NaF-containing cryolite.

Beneath the carbon cathode 16 and current collector bars 18, the cell is provided with a refractory lining 17 between the carbon cathode and the lower metal wall 13. The upper part of this lining consists of a layer 21 of CaO and the lower part 22 consists of a layer of insulating alumina-silica based refractory whose alumina:silica ratio could be less than equal to or higher than 0.85.

The barrier layer 21 prevents fluorides from the molten cell contents 20 from penetrating into the lower layer of the refractory lining 17. This reduces deterioration of the lower refractory layer 22, if its alumina:silica ratio is less than 0.85, and also prevents disposal problems when the cell lining has to be replaced.

The present invention is described in more detail below with reference to the following Examples and Comparative Examples, but should not be construed as limited thereto.

COMPARATIVE EXAMPLE 1

A firebrick having an alumina:silica ratio of about 0.66 (by weight) was removed from a conventional 60kA prebaked anode Hall-Heroult cell after about one year of service below the cathode blocks and was analyzed by X-ray diffraction (XRD).

The results showed that the brick was glassified and contained NaF as a major component.

Thus, the low alumina refractory disadvantageously contained a large amount of a leachable fluoride after use in the conventional cell and the refractory had reduced insulating properties as a result of glassification.

COMPARATIVE EXAMPLE 2

A refractory brick having an alumina:silica ratio of about 1.2 (by weight) was removed from a conventional 60 kA prebaked anode cell after about one year of service beneath the cathode blocks and was analyzed by XRD.

The results showed that the brick was not glassified, but contained NaF as a major compound.

This shows that while high alumina refractories may not be adversely affected by solid fluoride penetration, they present disposal problems when they have to be replaced.

EXAMPLE 1

Natural calcite having the composition and granulometric distribution shown in Tables 1 and 2 below, respectively, was tested in contact with sodium compounds under conditions similar to those encountered in cell potlinings.

The tests consisted in the immersion of a calcite sample contained in a cathodically charged graphite crucible into a molten bath containing dissolved alumina and subjected to electrolysis at 30 amps under a nitrogen atmosphere. The bath ratio (NaF:AlF$_3$): was 3.2 (by weight) and the temperature was maintained at 950° C. for 48 hours.

After the test, the calcite sample was analyzed by XRD. The results showed that lime (CaO) was the major compound present with no trace of fluorides.

This shows that calcite is not deteriorated and penetrated by the chemicals diffusing through the carbon cathode blocks in aluminum reduction cells.

TABLE 1

Typical Chemical Composition of the Calcite Sample

| Chemicals | Contents (wt. %) |
|---|---|
| CaO | 52.42 |
| SiO$_2$ | 4.19 |
| Al$_2$O$_3$ | 0.71 |
| Fe$_2$O$_3$ | 0.15 |
| MgO | 1.36 |
| SO$_3$ | 0.16 |
| K$_2$O | 0.24 |
| Na$_2$O | 0.47 |
| TiO$_2$ | 0.01 |
| loss on Ignition | 40.94 |

TABLE 2

Typical Granulometric Distribution of the Calcite Sample

| Fraction (U.S. Mesh) | Content (wt. %) |
|---|---|
| −¼ + 4 | 3 |
| −4 + 8 | 25 |
| −8 + 16 | 23 |
| −16 + 30 | 12 |
| −30 + 50 | 16 |
| −50 + 100 | 11 |
| −100 + 200 | 6 |
| −200 | 4 |

COMPARATIVE EXAMPLE 3

This example is to show that calcium oxide (CaO) and calcium carbonate (CaCO$_3$) do not prevent the penetration of molten electrolyte, despite the teachings of U.S. Pat. No. 4,683,046.

Samples of calcium oxide powder (−100 Tyler mesh particles) and calcium carbonate aggregates (−¼ inch particles) in accordance with the teaching of U.S. Pat. No. 4,683,046 were inserted and then compacted by vibration into two separate graphite crucibles each having an internal diameter of 2.5 inches. The height of both samples was about 3 inches. On top of each sample was inserted about 500 g of electrolyte, in the form of a cylindrical piece, having the following composition:

NaF/AlF$_3$=3.2(in weight)
CaF$_2$=8.0wt. %
Al$_2$O$_3$ 2.3wt. %

This electrolyte had a melting temperature of about 890° C.

The crucibles were then heated in a vertical electrical furnace, up to a soaking temperature of 950° C. During heating, the samples were periodically observed.

During heating and following the melting of the electrolyte, it was possible to observe the penetration of the molten electrolyte into both samples. After about 5 hours of soaking at 950° C., it was decided to cool down the furnace. After cooling, both samples had the form of solid cylinders. Their softening temperature was measured and a mean value of about 815° C. was obtained.

This shows that calcium oxide and calcium carbonate did not prevent the penetration of the molten electrolyte during the test, but also contributed to decrease its melting temperature.

EXAMPLE 2

This example shows that calcium oxide (CaO) and calcium carbonate ($CaCO_3$) prevent the penetration of solid fluoride compounds.

Samples of calcium oxide powder (−100 Tyler mesh particles) and calcium carbonate (−¼ inch particles) were tested under conditions similar to those encountered below the carbon cathode blocks during the operation of a cell.

The test consisted of a cathodically charged inner graphite crucible containing the sample (3 in. diameter × 3 in. height), and immersed in a molten electrolyte, which was contained in an anodically charged outer graphite crucible. A constant electrical current was maintained in the bath between the graphite crucibles (the electrodes) during the test by a stabilized 30 amp. current source. The electrolyte composition was as follows:

$NaF/AlF_3 = 3.2$ (in weight)
$CaF_2 = 8.0$ wt. %
$Al_2O_3 = 2.3$ wt. %

During the test, the sample was exposed mainly to sodium (Na) and sodium fluoride (NaF) which diffused through the inner graphite crucible.

The tests were pursued at 950° C. for 24 hours under nitrogen.

After the tests, the samples which generally had their original appearance were analyzed by X-ray diffraction (XRD), Inductively Coupled Plasma (ICP) and Colorimetry. The results are shown in Table 3. For comparison, Table 3 also includes the results obtained for a conventional diatomite-based potlining insulating brick tested in the same conditions.

Unlike this latter reference product, both calcium oxide and calcium carbonate samples contained negligible amount of fluorine after the test.

TABLE 3

Characteristics of the products tested under conditions similar to those encountered below the carbon cathode blocks during the operation of a cell

| | Products | | |
|---|---|---|---|
| | Calcium oxide | Calcium carbonate | Diatomite-based insulating brick |
| Mineralogy | | | |
| Cryolite ($Na_3AlF_6$) | N.D.* | N.D. | N.D. |
| Sodium fluoride (NaF) | N.D. | N.D. | Major** |
| Calcium fluoride ($CaF_2$) | N.D. | N.D. | N.D. |
| Composition. wt. % | | | |
| Na | 8.6 | 13.5 | 12.7 |
| F | 0.2 | 0.2 | 6.4 |
| Others | 91.2 | 86.3 | 80.9 |

*N.D. = not detected by XRD
**With respect to the relative peaks intensity recorded on the X-ray diffraction spectrum.

EXAMPLE 3

This Example shows that the amount of absorbed fluorine in pot-lining refractories can significantly be reduced by the use of the calcite barrier.

By using similar testing conditions as those reported in the Example 2, a sample of refractory material surrounded by a ¼ inch protective layer of calcite (−65 Tyler mesh) was tested. This sample was compared to a non-protected sample of the same material tested in the same conditions.

After the tests, the fluorine content of the protected sample was about 150 times less than in the non-protected one (i.e., 9.1 wt. % as compared to 0.06 wt. % of fluorine, respectively).

COMPARATIVE EXAMPLE 4

This example shows that materials such as magnesia (MgO), alumina ($Al_2O_3$) aluminosilicate ($Al_2O_3 + SiO_2$) and calcium-aluminosilcate ($CaO + Al_2O_3 + SiO_2$) do not prevent the penetration of solid fluoride compounds.

By using similar testing conditions as those reported in the Example 2, various commercial products were tested. After the test the samples were analyzed by X-ray diffraction (XRD), Inductively Coupled Plasma (ICP) and colorimetry. The results are shown in Table 4.

TABLE 4

Characteristics of the Products Tested Under Conditions Similar to those Encountered Below the Carbon Cathode Blocks during the Operation of a Cell

| | PRODUCTS | | | |
|---|---|---|---|---|
| | COMMERCIAL MAGNESIA | COMMERCIAL ALUMINA | COMMERCIAL ALUMINO-SILICATE REFRACTORY | COMMERCIAL CALCIUM-ALUMINO-SILICATE REFRACTORY |
| ORIGINAL COMPOSITION, wt. % | | | | |
| $Al_2O_3$ | N.D. | >99 | 26.5 | 43 |
| CaO | D.D. | N.D. | N.D. | 25 |
| MgO | >99 | N.D. | N.D. | N.D. |
| $SiO_2$ | N.D. | N.D. | 61.5 | 29 |
| COMPOSITION AFTER THE | | | | |

TABLE 4-continued

Characteristics of the Products Tested Under Conditions Similar to those Encountered Below the Carbon Cathode Blocks during the Operation of a Cell

| | PRODUCTS | | | |
|---|---|---|---|---|
| | COMMERCIAL MAGNESIA | COMMERCIAL ALUMINA | COMMERCIAL ALUMINO-SILICATE REFRACTORY | COMMERCIAL CALCIUM-ALUMINO-SILICATE REFRACTORY |
| TEST, wt. % | | | | |
| Na | 18.6 | 23.4 | 11.4 | 9.1 |
| F | 15.4 | 13.5 | 5.2 | 4.8 |
| PRINCIPAL CORROSION PRODUCTS IDENTIFIED | $NaMgF_3$ | $NaAlO_2$ $NaAl_{11}O_{17}$ | $NaAlSiO_4$ | $Ca_2SiO_2F_2$ $NaAlSiO_4$ |
| NaF DETECTED AFTER THE TEST AS A MAJOR COMPOUND | yes | yes | yes | yes |

In all cases the sample was corroded during the test by the NaF and/or the metallic sodium. This led to the formation of reaction products in the sample which permitted the penetration of the NaF during the test.

In all cases, the reaction products identified were not obvious on a thermodynamical point of view, particularly in the case of the magnesia material. Based on these results it was also not obvious before we could test it that the line barrier would be efficient to prevent the penetration of solid fluoride compounds.

I claim:

1. Apparatus for containing a molten fluoride-containing salt material at high temperature comprising an outer shell partially surrounding an interior space for containing said salt mixture, said shell having a lower wall, an internal lining for said shell, at least adjacent to said lower shell wall, made of a material substantially impermeable to said molten salt mateiral, and at least one layer of refractory material between said lining and said lower shell wall, wherein said at least one refractory layer comprises a continuous barrier layer of CaO adjacent to said lining material.

2. Apparatus according to claim 1 wherein said lining is made of carbon.

3. Apparatus according to claim 1 forming an aluminum reduction cell containing electrodes for electrolyzing a substance contained in said molten salt material and wherein said lining of impermeable material is a carbon layer acting as a cathode of said cell.

4. Apparatus according to claim 1 wherein said at least one refractory layer additionally comprises at least one layer of alumina-silica based refractory heat-insulating material positioned between said barrier layer and said shell.

5. Apparatus according to claim 1 wherein said CaO is a material having been formed in situ from a layer of a CaO precursor that was converted to CaO as the apparatus was heated to an operating temperature.

6. Apparatus according to claim 5 wherein said precursor is calcium carbonate.

7. Apparatus according to claim 5 wherein said precursor is calcite.

8. Apparatus according to claim 1 wherein said CaO has a purity of at least 80% by weight.

9. Apparatus according to claim 1 wherein said CaO has a purity of at least 90% by weight.

10. Apparatus according to claim 1 wherein said barrier layer is made up of particles of CaO having a size smaller than ¼ mesh U.S. Sieve Series.

11. Apparatus according to claim 1 wherein said barrier layer has a thickness of about 0.5–3 inches.

12. Apparatus according to claim 1 wherein said at least one refractory layer consists solely of said barrier layer.

13. Apparatus according to claim 1 wherein said at least one refractory layer comprises a layer of an alumina-silica based refractory material having an alumina:silica ratio lower than 0.85 immediately adjacent to said barrier layer.

14. Apparatus according to claim 1 wherein said shell includes sidewalls provided internally with a lining of a material impermeable to said molten material, and wherein a barrier layer of CaO is positioned between said shell sidewalls and said sidewall lining.

15. Apparatus according to claim 14 wherein said barrier layer positioned between said shell sidewalls and said sidewall lining has a thickness of about 0.5 to 1 inch.

16. Apparatus according to claim 14 wherein said barrier layer positioned between said shell sidewalls and said sidewall lining is in the form of a powder comprising particles smaller than 65 Tyler mesh.

* * * * *